United States Patent
McQueen et al.

(10) Patent No.: US 9,228,881 B2
(45) Date of Patent: Jan. 5, 2016

(54) METHOD AND APPARATUS FOR IN-SITU CALIBRATION AND FUNCTION VERIFICATION OF FLUID LEVEL SENSOR

(71) Applicants: Malcolm M. McQueen, Encinitas, CA (US); Eric J. Wible, Carlsbad, CA (US)

(72) Inventors: Malcolm M. McQueen, Encinitas, CA (US); Eric J. Wible, Carlsbad, CA (US)

(73) Assignee: FLUID COMPONENTS INTERNATIONAL LLC, San Diego, CA (US)

( * ) Notice: Subject to any disclaimer, the term of this patent is extended or adjusted under 35 U.S.C. 154(b) by 383 days.

(21) Appl. No.: 13/841,525

(22) Filed: Mar. 15, 2013

(65) Prior Publication Data

US 2014/0260521 A1 Sep. 18, 2014

(51) Int. Cl.
*G01F 25/00* (2006.01)
*G01F 23/24* (2006.01)

(52) U.S. Cl.
CPC .......... *G01F 25/0061* (2013.01); *G01F 23/241* (2013.01); *G01F 23/242* (2013.01)

(58) Field of Classification Search
CPC .................................................. G01F 25/0061
USPC ........................................................... 73/1.73
See application file for complete search history.

(56) References Cited

U.S. PATENT DOCUMENTS

| 3,366,942 | A |   | 1/1968  | Deane |
|-----------|---|---|---------|-------|
| 3,673,850 | A | * | 7/1972  | Burrus ................. G01F 23/268 73/1.73 |
| 3,898,638 | A |   | 8/1975  | Deane et al. |
| 4,465,088 | A | * | 8/1984  | Vosper ................. F24H 9/2007 122/504 |
| 4,977,385 | A |   | 12/1990 | McQueen |
| 5,167,153 | A |   | 12/1992 | McQueen |
| 6,340,243 | B1|   | 1/2002  | Deane et al. |

FOREIGN PATENT DOCUMENTS

| DE | EP 0441999 A1 * | 8/1991  | ............. F22B 37/78 |
| DE | EP 0556678 A2 * | 8/1993  | ............ G01F 23/242 |
| GB | 1533655 A *     | 11/1978 | ............. G01F 23/56 |
| GB | 2086056 A *     | 5/1982  | ............ G01F 23/263 |

* cited by examiner

*Primary Examiner* — Peter Macchiarolo
*Assistant Examiner* — Nathaniel Kolb
(74) *Attorney, Agent, or Firm* — The Maxham Firm (57) ABSTRACT

An in-situ method and apparatus for calibrating and verifying the operational accuracy of a fluid level sensor.

17 Claims, 6 Drawing Sheets

METHOD AND APPARATUS FOR IN-SITU CALIBRATION AND FUNCTION VERIFICATION OF FLUID LEVEL SENSOR

FIELD OF THE INVENTION

The method and apparatus described herein relate generally to liquid level sensors and, more particularly to in-situ verification of level output signal accuracy of liquid level sensors including differential temperature liquid level sensors.

BACKGROUND OF THE INVENTION

It is necessary, in many instances, to monitor the fluid depth in containers or in storage or holding pools. Where the stored fluid is potentially toxic, the requirement for fluid depth monitoring is of enhanced importance.

Along with appropriate sensors and readout systems, the persons responsible for the fluid storage need to feel confident that the depth or fluid level gauge is accurate at all times. Some kind of operability verification apparatus and procedure is required. In the past, removing the gauge to a remote location for calibration and function testing was the recognized way to verify the operability and accuracy of the system.

SUMMARY OF EMBODIMENTS OF THE INVENTION

Embodiments of the concept as shown herein speed up and simplify the process of calibration and verification of accuracy of a differential temperature depth or fluid level gauge.

The fluid level gauge itself is known and operates on the known heated sensor principle. Examples of elongated, continuous sensing fluid level gauges are described in U.S. Pat. Nos. 4,977,385 and 5,167,153. An elongated resistance temperature detector (RTD) sensing wire or wires are cable mounted inside an elongated, mineral-filled tube. The cable mineral is electrically insulative and thermally conductive. This continuous RTD provides continuous fluid level readings which result from the resistance changes as level and heat transfer rate changes which result from wet/dry changes at different levels along the RTD.

In some embodiments of elongated continuous sensing gauges, there are heater elements, usually wires, adjacent to usually unheated elements of similar size wire. A relatively low electrical power, about 0.5 watt per foot of cable length, for example, is applied to the heated wire. This causes the electrical resistance to increase in the adjacent RTD wire. Parallel to the heated wires are unheated, or reference, cables. When the cable or the surrounding tube and mineral filling are submerged, the fluid dissipates heat from the heated wire and the RTD electrical resistance decreases to a value substantially greater than the reference cable. The change, or delta, of the resistance is a proportional measure of the fluid level and associated instrumentation provides readings of the fluid level in the container. Calibration prior to installation is necessary for this output to properly indicate fluid level.

The RTD element may be heated by an adjacent, parallel elongated heater wire supported by an insulator as above, or it may be self-heated and function as a heater and concurrently as a sensor. Also it could be operated on a time-shared basis. An electrical signal proportional to the fluid level is connected to electronic circuitry at a remote location (the instrumentation) which provides appropriate readouts of the fluid level.

In order to verify proper operation of the RTD gauge without removing the apparatus from the fluid container, the sensor, which includes the RTD, is encased in a still well, which is open at the bottom, similar in length to the RTD element. When operating normally, the fluid is in the still well is at the same depth as is the surrounding fluid in the container.

Discrete or point RTD sensors are exposed on the inner tube at predetermined levels. Pressurized air or an appropriate inert gas is pumped into the top sealed still well, thereby lowering or reducing the fluid therein to any desired level. Readings of the RTD gauge are taken as the fluid reaches the desired predetermined levels, such as, 100%, 75%, 50%, and 25% of maximum fluid level, and the outputs are compared with the known levels, as determined by the discrete, or point sensors and, selectively, by the applied gas pressure. Basic point sensor heated RTD type sensors are described in U.S. Pat. Nos. 3,366,942, 3,898,638, and 6,340,243, for example. Point sensors operate on the same principle as described above. Fluid dissipates heat more readily than does air, so when a heated sensor is dry, its resistance is higher than when it is wet and indicates that the fluid level is at or below the point sensor. The unheated sensor is employed as a reference sensor to compensate for media temperature changes. Alternatively, a single sensor can be alternately heated and unheated to provide both functions on a time-shared basis, or if the media temperature remains within 50° F. of a predetermined value, the sensor can be powered sufficiently so that a reference sensor is not needed.

Corrective action can be taken if the sensor fluid level differs by a predetermined amount from the levels determined from the applied pressure or from the point sensors. In some instances the level gauge may be recalibrated electronically, without removing it from the container.

Alternative apparatus and testing methods are described herein.

BRIEF DESCRIPTION OF THE DRAWING

The advantages and features of this concept will be more readily perceived from the following detailed description, when read in conjunction with the accompanying drawing, wherein.

DETAILED DESCRIPTION OF EMBODIMENTS OF THE INVENTION

Figure 1:
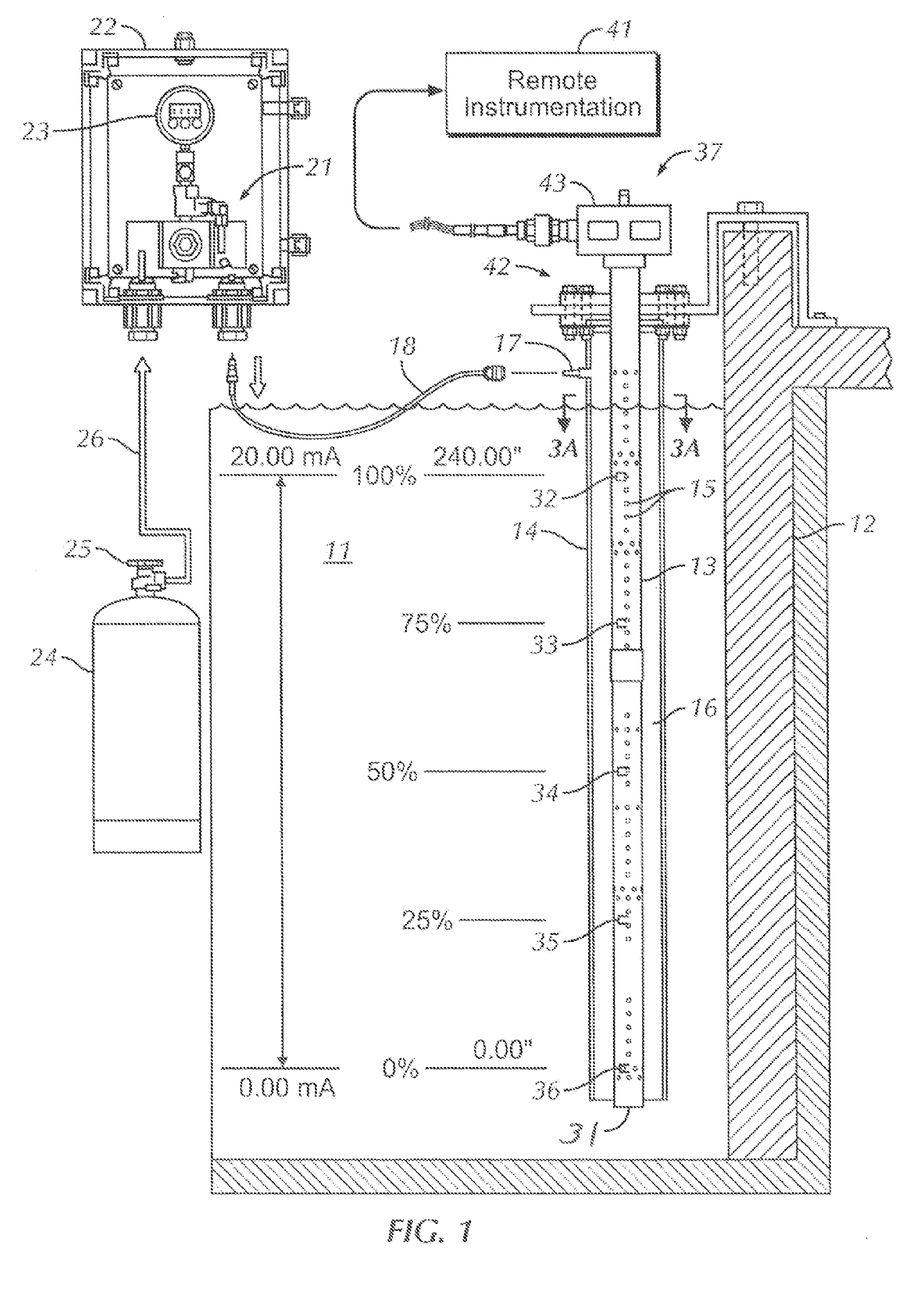
FIG. 1 is a schematic representation of an embodiment of the invention.

With reference now to the drawing, and more particularly to FIG. 1 thereof, an overall exemplary arrangement of the concept is shown. The fluid in container 12 is indicated by reference numeral 11, and may be any fluid. Container 12 may be any type of liquid holding volume, from a pond in the ground to a container of any size and shape.

Elongated, continuous sensing element 13 is a hollow perforated tube with elongated RTD elements inside, as will be described in greater detail below. Tube 13 is encased within still well 14 with space 16 therebetween. Tube 13 is formed with a multiplicity of holes 15 to allow the fluid to contact the RTD elements inside and allow heated fluid (liquids and gases) to escape.

Nipple 17 is connected to line 18 for transportation of a gas to and from space 16. The other end of line 18 is coupled to pressure regulator 21 within control box 22. Pressure gauge 23 provides an instantaneous pressure reading of the gas applied to line 18. The pressure regulator is conventional and includes an ON/OFF switch or control to selectively open and close the line to the pressurized gas.

Tank 24 represents a source of pressurized air or some other gas such as nitrogen. The pressurized gas may be supplied from any source and need not be an actual tank. Pressurized gas is coupled through valve 25 to pressure regulator 21 through line 26.

As an alternative to a manually operated valve on the pressure regulator, any kind of electronic or solenoid valve may be operated to vary the pressure in space 16 by a simple push button or a rheostat, or it could be on a timer, or it could be operated remotely from a control that is connected by wires or wirelessly to the valve control. A remote pressure gauge could also be employed to enable the operator to have full information of the fluid level and the condition of the gauge from a distance. The tank, control box, and line 18 are removable and are only used for calibration and verification tests.

As set up in this example, the maximum fluid level (100%) is 20 feet above the base (0%) level. The bottom 31 of gauge 13 is at or slightly below the base fluid level and is sealed. For testing purposes, interim fluid levels (75%, 50%, and 25%) are shown. Of course, other interim levels may be employed, and the fluid depth is not limited to 20 feet. It could be less or much more, ranging from as low as 10 inches to 60 feet or more.

To reduce the level of fluid in the still well, and assuming the liquid to be water, a gas pressure of 0.433 pounds per square inch (psi) per vertical foot is required to be applied through line 18 to space 16. Assuming the starting liquid (water) level is maximum, or at the 100% level, to reduce the fluid level by 25% (5 feet in this example), the valve in control box 22 would be opened sufficiently to allow pressure in line 18 to build to 2.165 psi, as it would be shown on gauge 23, thereby forcing the fluid level in still well 14 down by 5 feet. Increasing the pressure to 4.33 psi reduces the fluid level in space 16 to 10 feet. Increasing the pressure at the top of space 16 to 6.495 psi forces the level of the fluid in the still well to 5 feet, or at the 25% level. Zero level is achieved by applying 8.66 psi of pressure to still well space 16 for a 20-foot fluid depth in the container. Any levels can be verified by applying 0.433 psi per vertical foot of displaced water to any desired level from 0-20 feet in this example. Of course, other liquids will have a different constant than 0.433, depending upon their density.

As stated previously, elongated gauge 13 is a conventional continuous sensor. Added to gauge 13 are point sensors 32, 33, 34, 35, and 36 for dual diverse reliability. These points also provide predetermined readings of fluid level in still well 14 at 100%, 75%, 50%, 25%, and 0% depths, respectively. While shown externally in FIG. 1, these point sensors would be mounted inside tube 13.

Whenever the validity of the liquid level output readings of gauge 13 is to be checked, without removing the entire gauging apparatus 37 from the container, the process outlined above is initiated. At the starting point, the fluid level in container 12 can be anywhere between full (100%) and empty (0%). The fluid level in space 16 in the still well will initially be the same as the level in the container. A third factor is the pressure shown by gauge 23. When the level of the fluid in still well 14 is at the 50% level while container 12 is filled to the 100% level for this 20-foot example, the readout for the RTD and point sensor 34 should be the same, that is 50% or 10 feet. Also, the pressure shown on gauge 23 should read 4.33 psi.

Assuming the liquid level at the start of the validity test is at 100%, as indicated by the first, or top, point level sensor 32, pressure is first applied through line 18 to reduce the fluid level in space 16 to, for example, the 75% level, as determined by readouts in remote instrumentation box 41. The electronic level indicator in instrumentation 41 would read one foot below full when a pressure of 0.433 psi is applied. For permanent installations, there are two sets of level reading systems in box 41. One is for instantaneous and continuous fluid level readings of the fluid 11 in container 12. The other is to provide independent readings from the point sensors on gauge 13 in the still well when validation tests are performed. When sensor 33 goes dry (it is no longer immersed in the fluid), a reading will indicate the fluid has dropped to or below the 75% level, or 15 feet in this example. The actual container fluid level reading should show exactly the same reading from gauge 13. To be sure the fluid level in space 16 is at the 75% level for test purposes, the pressure applied to still well 14 is toggled so that sensor 33 is alternately wet and dry to be sure the dry level reading accurately reflects a 75% level. Pressure gauge 23 should nominally read 2.165 psi, providing further confirmation of the fluid level in the still well. This factor shows that pressure gauge readings are a second check on fluid level sensor accuracy. Any two of these readings can be compared to indicate sensor accuracy.

Readings are then taken in the same way at the lower levels, by engaging point sensors 34, 35, and 36 in order to check the point sensor level readings against the readings of continuous level gauge 13 as the fluid level is reduced during validation testing, and obtaining confirmation from pressure gauge 23. Instrumentation box 41 also includes a conventional comparator signal of, for example, 0 to 20 mA as depicted in FIG. 1 of the comparator. It may also provide a visual and possibly an audible indication of the coincidence of the sensor level signals. If fluid level indications from the sensors do not agree by a chosen predetermined amount, 1 or 2% for example, an audible alarm can be activated along with a visual signal of "error" being provided. The visual pressure readings on gauge 23 provide a second independent check of fluid level indication accuracy when used. If gauge 23 shows 4.33 psi but one or both level sensors do not show a fluid depth reduction of ten feet, there is lack of coincidence and the operator knows some aspect of the level sensor system, or the pressure indicator, is incorrect. Thus the accuracy of electronic output 41 is concurrently validated at any desired level with respect to pressure gauge 23 and point level sensors, as discussed above.

It should be noted that the testing can be accomplished, as above described, in the reverse order, that is, the liquid in the still well can be forced to 0% initially, so that all point and continuous sensors are dry. Then pressure in space 15 is reduced sequentially to hit any increasing fluid levels, especially at 25%, 50%, 75%, and 100%. As a matter of fact, the testing can be double checked by starting at the top, taking readings at the different pre-established pressure levels, and then taking parallel readings from the bottom up. Air may be allowed to escape through nipple 17, or a separate exhaust valve may be included at the top of still well 14.

As a detail, top mounting flange arrangement 42 seals the top of still well (stand pipe) 14 and secures gauge 13 and still well 14 in fixed relationship when tube 18 is connected to nipple 17. This couples the signals from gauge 13 as well as from point sensors 32-36 to remote instrumentation 41.

Figure 2:
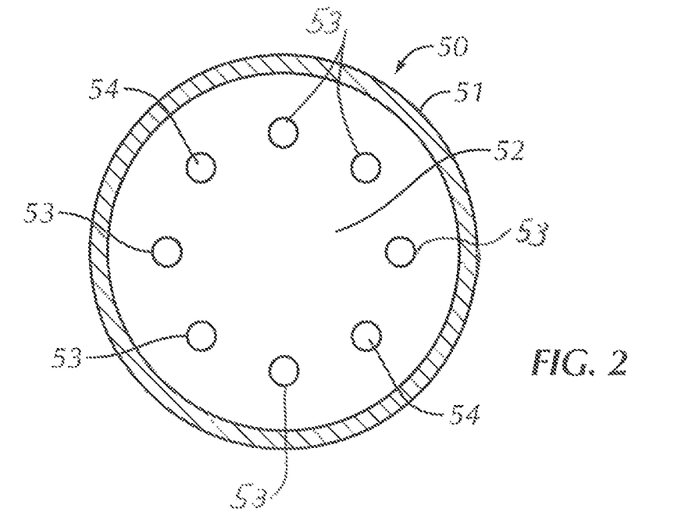
FIG. 2 is a sectional end view of one continuous elongated sensing cable as employed in the embodiments of the invention.

A cross section of a typical continuous sensing RTD cable 50 is shown in FIG. 2. The external casing 51 is a thin walled conductive metal filled with a granular mineral material 52 such as magnesium oxide (MgO). RTD wires 53 are embedded in the mineral material. As is conventional, two such cables are used, with one heated and the other being an unheated, or reference, sensor. Typically the heated cables are energized by connecting such wires 54 to an electrical current source so that these wires become heated, thereby heating remaining wires 53. More than one pair of wires may be heated if desired.

The RTD cables are normally configured in pairs because they are a long loop, extending full length of casing 51 and returning to the electronics in enclosure 41. One cable is the heated, or active, element, and the second is the unheated, or reference element which is employed to compensate the instrument for variations in the media temperature.

Examples of dimensions involved in the RTD cables are: casing 51 is about 0.118 inches in diameter, perforated tube 13 may be about 3 inches in diameter, and still well 14 may be 4.0-4.5 inches or larger, in diameter. The mineral filling may be magnesium oxide (MgO) or any other substance that is stable, is electrically insulative, and is at least somewhat thermally conductive. RTD wires 53 (FIG. 2) are typically made of nickel or a suitable compound or alloy, which are temperature sensitive, that is, their resistance changes with the temperature. The heater wires 54 are less, or relatively insensitive, to temperature sensitive and heat up as current is applied to them rather than being used as a measure of heat dissipation based on temperature reduction, as is the case with the above nickel wires 53.

Figure 3A:
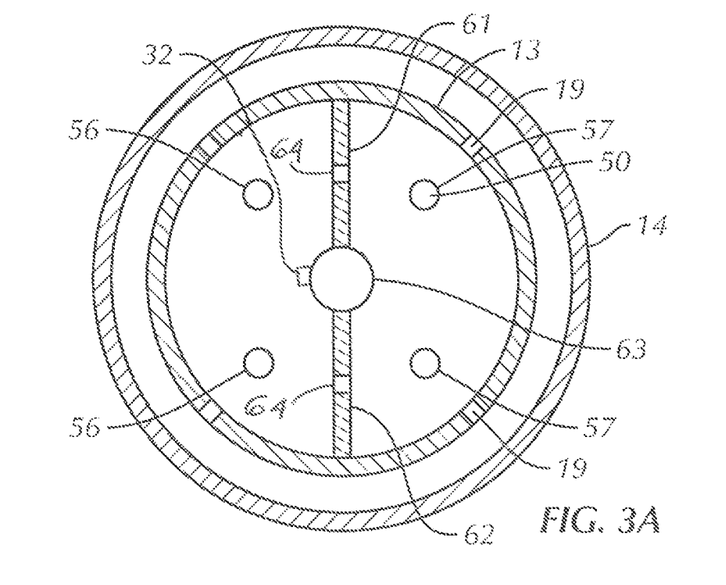
FIG. 3A is a sectional end view of the tube and still well of FIG. 1, taken along cutting plane 3A-3A.
Figure 3B:
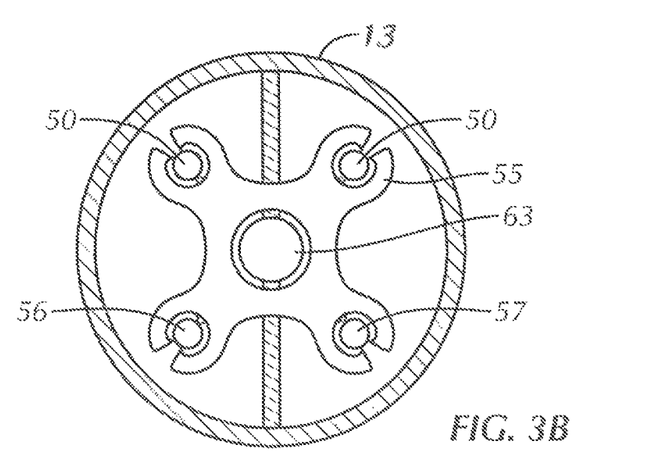
FIG. 3B is a sectional view similar to FIG. 3A, showing sensor cable retaining elements.

FIG. 3A is cross section of the calibration verification system of FIG. 1, taken through cutting plane 3A-3A of FIG. 1. Inside still well 14 is perforated tube 13 having a multiplicity of holes 19 to provide access by the RTD sensors to the fluid in the container and in the still well to allow heated fluid media to escape from tube 13. Supports 55 in FIG. 3B maintain RTD cables 50, 56, 57 of FIGS. 2 and 3A in position within tube 13. These supports may be referred to as spiders or baffles and there are several of them secured to conduit 63. They may be spaced along conduit 63, six to twelve inches apart as appropriate to secure the positions of RTD cables 50 within perforated tube 13. Each RTD cable is engaged by a baffle 55 at three points as shown. These are structured as point contacts to prevent heat transfer between the baffles and the RTD cables, which could affect the accuracy of the sensing being performed by the cables. Cables 56 are heated and cables 57 are reference, or unheated, cables, as discussed above. Partitions 61, 62 are provided within tube 13 to minimize cross talk between the heated and unheated sides of the fluid in tube 13. Holes 64 in the partitions permit cool air from the reference side to ventilate the heated side and thereby allow the heated media to escape tube 13 via holes 19. Point sensor 33, the 75% level sensor, is shown outside tube 13 in FIG. 1. The point sensors are mounted on the inside of tube 13 or on center conduit 63 (as shown in FIG. 3A), which may be located in this conduit. Conduit 63, which may be 0.75 inches in diameter, provides space for the point sensor wires to communicate between the point sensors and the remote instrumentation.

Figure 4:
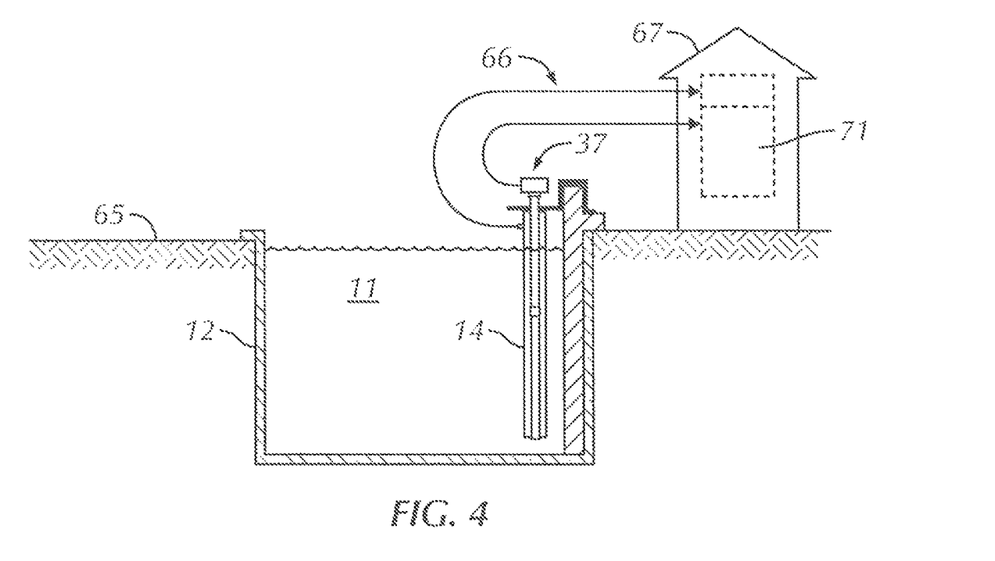
FIG. 4 is a schematic of the embodiment of FIG. 1 in an exemplary environment.

FIG. 4 is a more distant schematic side view of the FIG. 1 installation, where the container is a pool of fluid 11 in ground 65, lined with tank 12. Sensing and function verifying apparatus 37 is connected via lines and wires 66 to control station 67, having all controls, gauges, and other operational apparatus 71 housed therein.

Figure 5:
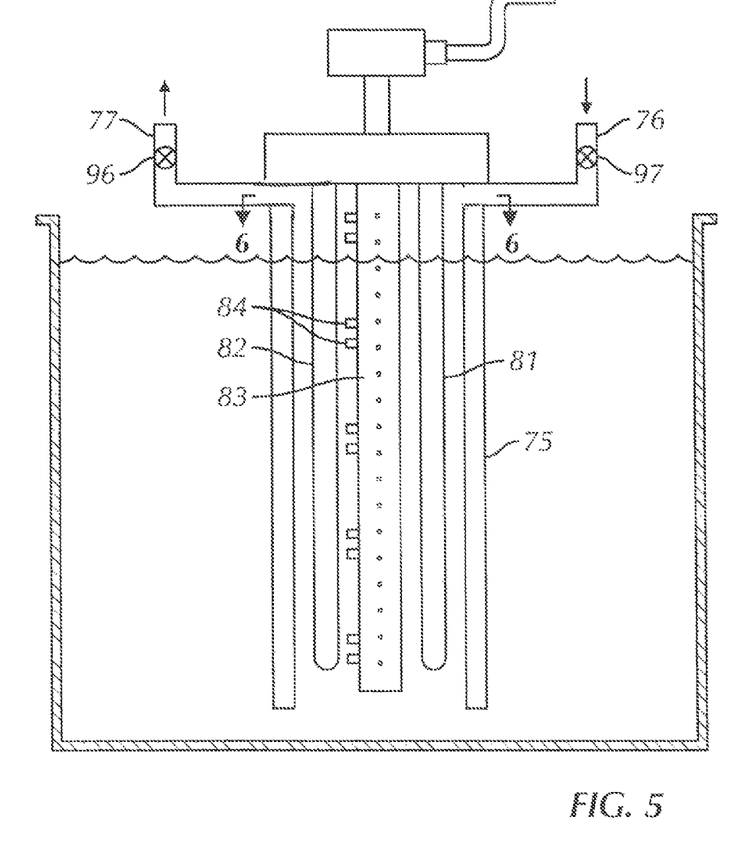
FIG. 5 is schematic representation, similar to a portion of FIG. 1, of an alternative embodiment of the invention.

A somewhat more detailed and alternative structural embodiment, which operates in accordance with the same principles as discussed above and depicts ventilation lines and control routes, is shown in FIG. 5. Still well 75 is equivalent to element 14 in FIG. 1, except for the top structure depiction of the pressurized gas inlet and outlet. Inlet and vent tubes 76 and 77, with respective valves 97 and 96, are shown here (and could also be employed in the FIG. 1 embodiment).

Pressurized gas is applied via inlet 76 via open valve 97, while valve 96 in outlet 77 is closed. RTD cable 81 could be the reference RTD and cable 82 could be the heated RTD. Point RTD sensors 84 are shown mounted on tube 83. These are shown in pairs because point sensors are often comprised of a heated or active sensor and a nearby unheated or reference sensor. Tube 83 provides a conduit for the point RTD connecting wires.

Figure 6:
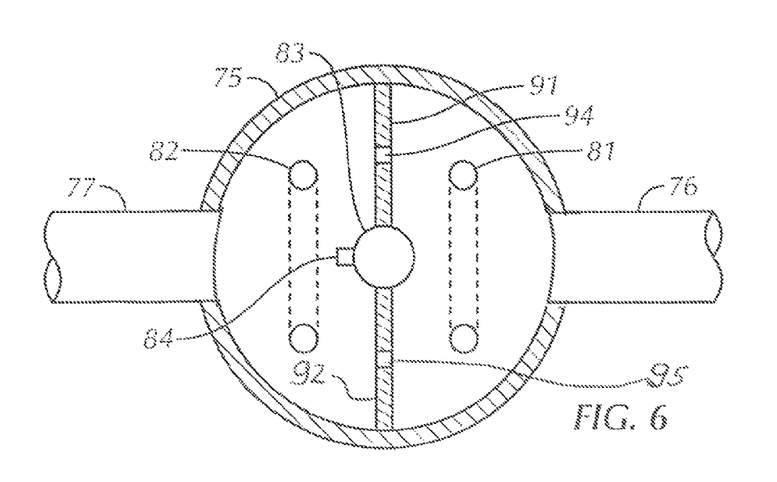
FIG. 6 is an enlarged top sectional view taken along cutting plane 6-6 of FIG. 5.

A top sectional view of FIG. 5 is shown in FIG. 6. Still well 75 has partitions 91, 92 on either side of center conduit 83, dividing the space within the still well. The partitions have holes 94 and 95 therein, respectively, to enable cool fluid to communicate between the two sides so that gas entering through conduit 76 effectively reduces the thermal stratification and substantially improves accuracy of the instrument.

To perform the verification of functionality tests employing the apparatus of FIGS. 5 and 6, outlet 77 is closed off by means of a simple valve 96, which can be activated by hand or remotely. Valve 97 is opened and pressurized gas is applied through inlet 76, using the same principles as previously described and the comparison readings are taken: pressure gauge, continuous RTDs, and point RTDs. Then inlet 76 is closed off by means of valve 97 and outlet valve 96 is opened. Since the fluid was under pressure in still well 75, opening valve 96 allows the warmed gas to exhaust as the fluid returns to ambient level. While the FIGS. 5 and 6 embodiment is an alternative, the inlet and the outlet, and the accompanying valves could also be employed in the embodiment of FIG. 1. In that case, pressurized gas would be applied through line 18 while valves 96 and 97 would be closed. Then both would be opened to exhaust more rapidly than would happen with nipple 17.

Figure 7:
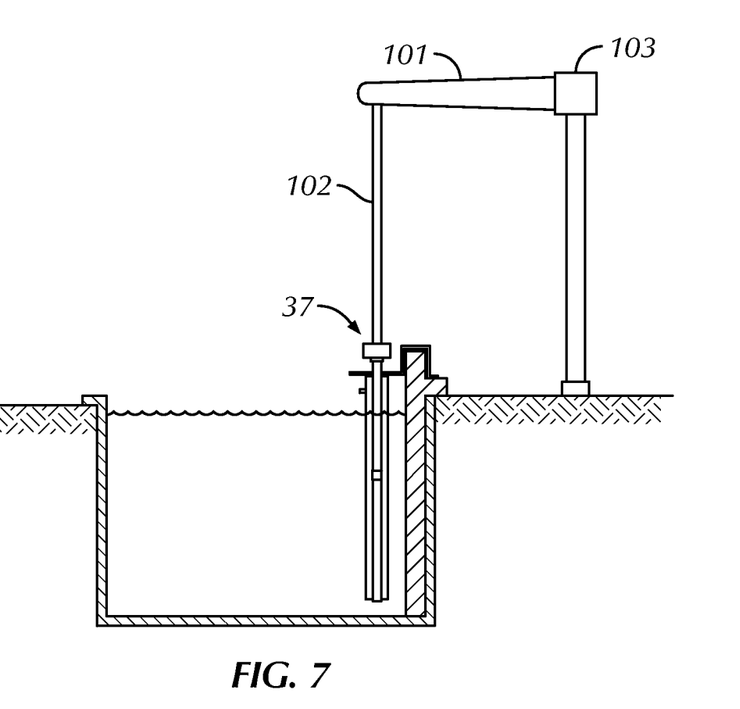
FIG. 7 shows an alternative method of achieving "in situ" fluid level changes to determine operational validity of the sensor apparatus of FIGS. 1 or 5.

While the embodiments described above are preferred, in that the testing can be conducted without moving the sensor apparatus from the container, an alternative manner of employing the same technical principles is shown in FIG. 7. The entire sensing apparatus may be connected to a lift arrangement, schematically shown in this figure. Instead of reducing the level of fluid engaging the elongated sensor, apparatus 37 may be connected to lift or boom structure 101 and chain or rope and pulley arrangement 102, operated by control 103, lifts sensor apparatus 37 in steps, equivalent to fluid level reduction steps of the previous description. Similar readings are taken, except there would be a double check by means of a lift distance in lieu of a pressure gauge.

Figure 8:
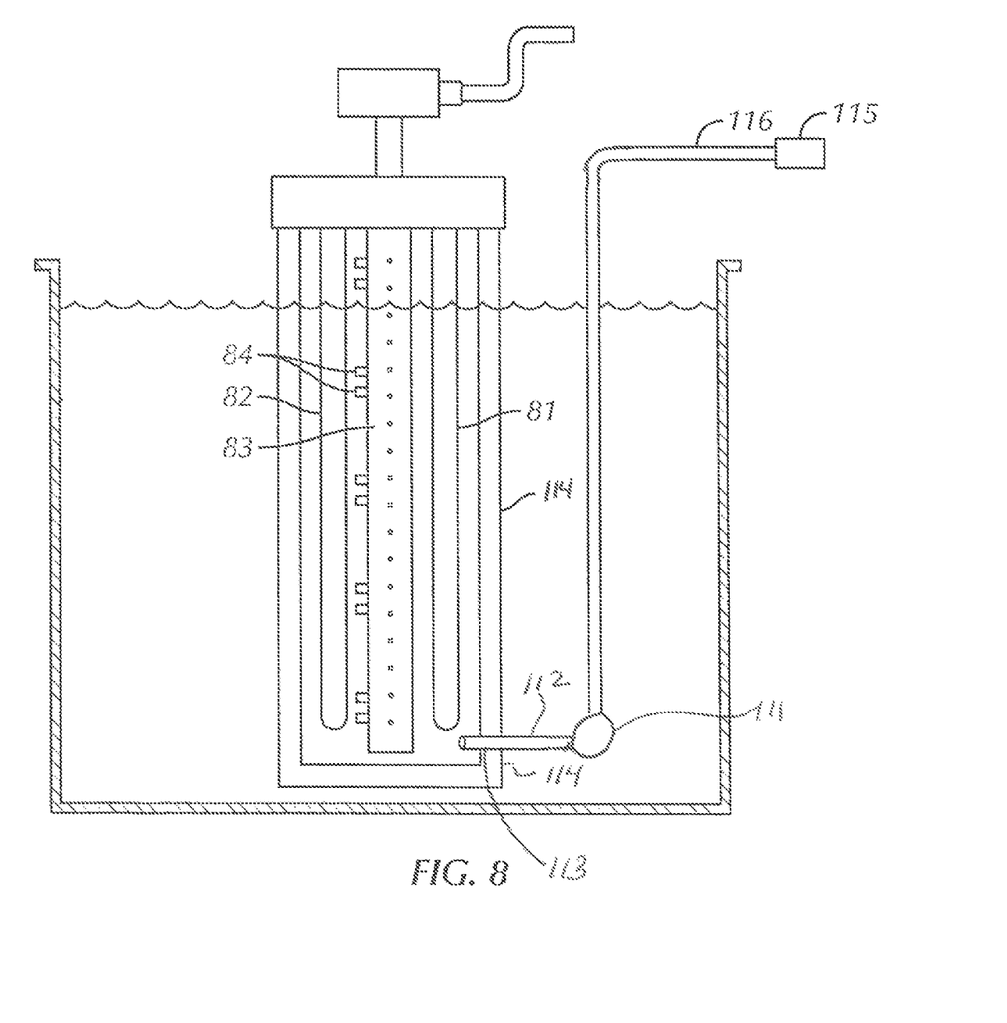
FIG. 8 is another alternative embodiment of sensor apparatus in accordance with an embodiment of the invention.

Another alternative embodiment of the verification concept is shown in FIG. 8. Here a small pump 111 is connected to the bottom of the still well through conduit 112 to feedthrough 113 in still well wall 114. The top of the still well is not sealed and the bottom is sealed. When pump 111 is energized, fluid is applied to measuring container 115 through conduit 116, thereby reducing the fluid level in the still well. The same readings from the fluid level in the primary container are taken as before, from the continuous sensor and the point sensors. A double check is provided by this arrangement by measuring the amount of fluid in container 115. Thus, for example, the amount, by any measure, typically by weight, of fluid to attain the 75% level is known. When all three readings are in concert, the sensor apparatus can be deemed to be operationally verified.

What is claimed is:

1. A method for in-situ testing of a fluid level sensor in a fluid container having a maximum fluid level, the method comprising:
    installing an elongated level sensor element in the fluid container, said sensor element having an external diameter and being configured with elongated continuous level sensor elements and at least two vertically spaced point level sensor elements;
    installing an elongated still well of length similar to said sensor element, said still well having an internal diameter greater than the external diameter of said sensor element, said level sensor element being within said still well;
    connecting a source of pressurized gas to said still well;
    applying gas at a predetermined pressure to said still well to reduce the fluid level therein to a first predetermined level;
    determining continuous level indicating signals from at least one of the continuous level sensor elements, the applied gas pressure, and from a first point level sensor at the first predetermined level;
    repeating the gas pressure application step to reduce the fluid level in said still well to other different predetermined levels; and
    determining continuous level indicating signals from the continuous level sensor element and from the applied gas pressures at each predetermined level.

2. The method of claim 1, wherein:
    the gas pressure application step is accomplished at a first pressure value to reduce the fluid level in the still well to the first predetermined level, and comprising the further step of:
    comparing the first pressure value with the level indicating signal from the continuous level sensor element.

3. The method of claim 2, wherein:
    the gas pressure application step is accomplished at a first pressure value to reduce the fluid level in the still well to the first predetermined level, and comprising the further step of:
    comparing the first pressure value with the level indicating signals from the continuous level sensor element and the first point level sensor.

4. The method of claim 3, and comprising the further step of:
    making sensor corrections when the first pressure value and the level indicating sensor signals from the continuous level sensor element and the first point level sensor do not indicate substantially the same level.

5. The method of claim 1, wherein:
    the gas pressure application step is accomplished at a first pressure value to reduce the fluid level in the still well to the first predetermined level, and comprising the further step of:
    comparing the first pressure value with the level indicating signal from the first point level sensor.

6. The method of claim 1, and comprising the further step of:
    comparing the level indicating signals from the continuous level sensing element and the point level sensors; and
    making sensor corrections when the level indicating sensor signals do not indicate substantially the same level.

7. The method of claim 1, wherein:
    the repeated gas pressure application steps have predetermined step pressurization values corresponding to each point level sensor element position, and comprising the further steps of comparing each point level sensor signal with each corresponding pressure value to determine the level of coincidence of the respective pressure values and level sensor signals; and
    making sensor corrections when the level sensor signals and the pressure values do not indicate substantially the same level.

8. A method for in-situ testing of a fluid level sensor in a fluid container having a maximum fluid level, the method comprising:
    installing an elongated level sensor element in the fluid container, said sensor element having an external diameter and being configured with elongated continuous level sensor elements and at least two vertically spaced point level sensor elements;
    installing an elongated still well of length similar to said sensor element, said still well having an internal diameter greater than the external diameter of said sensor element, said level sensor element being within said still well;
    connecting a source of pressurized gas to said still well;
    applying gas at a predetermined pressure to said still well to reduce the fluid level therein to a first predetermined level;
    determining continuous level indicating signals from at least one of the continuous level sensor elements, from the applied gas pressures, and from a first point level sensor at the first predetermined level;
    reducing the applied gas pressure and repeating the gas pressure application step to increase the fluid level in said still well to higher predetermined levels; and
    determining continuous level indicating signals from the continuous level sensor element, from the applied gas pressures, and from point level sensors at each predetermined level.

9. The method of claim 8, wherein:
    the gas pressure application step is accomplished at a first pressure value to reduce the fluid level in the still well to the first predetermined level, and comprising the further step of:
    comparing the first pressure value with the level indicating signal from the continuous level sensor element.

10. The method of claim 9, wherein:
    the gas pressure application step is accomplished at a first pressure value to reduce the fluid level in the still well to the first predetermined level, and comprising the further step of:
    comparing the first pressure value with the level indicating signals from the continuous level sensor element and the first point level sensor.

11. The method of claim 10, and comprising the further step of:
    making sensor corrections when the first pressure value and the level indicating sensor signals from the continuous level sensor element and the first point level sensor do not indicate substantially the same level.

12. The method of claim 8, wherein:
the gas pressure application step is accomplished at a first pressure value to reduce the fluid level in the still well to the first predetermined level, and comprising the further step of:
comparing the first pressure value with the level indicating signal from the first point level sensor.

13. The method of claim 8, and comprising the further step of:
comparing the level indicating signals from the continuous level sensing element and the point level sensors; and
making sensor corrections when the level indicating sensor signals do not indicate substantially the same level.

14. The method of claim 8, wherein:
the repeated gas pressure application steps have predetermined step pressurization values corresponding to each point level sensor element position, and comprising the further steps of comparing each point level sensor signal with each corresponding pressure value to determine the level of coincidence of the respective pressure values and level sensor signals; and
making sensor corrections when the level sensor signals and the pressure values do not indicate substantially the same level.

15. An apparatus for in-situ testing of a differential fluid level sensor in a fluid container having a maximum fluid depth, the apparatus comprising:
an elongated continuous level sensor element installed in the container, said continuous sensor element being longer than the maximum gauging length of the fluid in the container and having output signals representing the level of fluid in the container;
an elongated still well generally commensurate in length with and surrounding said level sensor element;
at least two vertically spaced point level sensors on said elongated continuous level sensor element, said point level sensors having output signals representing changes in fluid level within said still well at predetermined levels;
a source of pressurized gas;
a connection for the source of pressurized gas to an inlet to apply gas to the interior of said still well;
a controller for controlling predetermined pressures and timings under which the gas is applied to the interior of said still well; and
a receiver for receiving said output signals from said continuous level and point level sensors and providing indication of the level of fluid in said still well.

16. The apparatus of claim 15, wherein said controller comprises a pressure regulator having a pressure gauge and a controllable valve, said pressure gauge representing the pressure applied to the interior of said still well at any time as a measure of the fluid level in said still well.

17. The apparatus of claim 15, and further comprising means for comparing the fluid level signals from said continuous level sensor and said point level sensors and providing an indication of a measure of the coincidence of fluid level indicated by the two signals.

* * * * *